(12) United States Patent
Okazaki et al.

(10) Patent No.: US 9,376,603 B2
(45) Date of Patent: Jun. 28, 2016

(54) POLYMERIZABLE COMPOSITION, AND CURED ARTICLE

(71) Applicant: MITSUBISHI GAS CHEMICAL COMPANY, INC., Chiyoda-ku, Tokyo (JP)

(72) Inventors: Hitoshi Okazaki, Tokyo (JP); Kousuke Namiki, Tokyo (JP); Motoharu Takeuchi, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/433,774

(22) PCT Filed: Oct. 16, 2013

(86) PCT No.: PCT/JP2013/078026
§ 371 (c)(1),
(2) Date: Apr. 6, 2015

(87) PCT Pub. No.: WO2014/061687
PCT Pub. Date: Apr. 24, 2014

(65) Prior Publication Data
US 2015/0252234 A1    Sep. 10, 2015

(30) Foreign Application Priority Data
Oct. 18, 2012    (JP) .................................. 2012-230603

(51) Int. Cl.
| | |
|---|---|
| *C08K 5/5313* | (2006.01) |
| *C08K 5/5317* | (2006.01) |
| *C08K 5/37* | (2006.01) |
| *C09J 181/02* | (2006.01) |
| *C09J 4/00* | (2006.01) |
| *C08G 75/04* | (2016.01) |
| *C09J 11/06* | (2006.01) |
| *C08K 5/092* | (2006.01) |
| *C08K 5/42* | (2006.01) |
| *C08K 5/43* | (2006.01) |

(52) U.S. Cl.
CPC .............. *C09J 181/02* (2013.01); *C08G 75/04* (2013.01); *C08K 5/092* (2013.01); *C08K 5/42* (2013.01); *C08K 5/43* (2013.01); *C08K 5/5313* (2013.01); *C08K 5/5317* (2013.01); *C09J 4/00* (2013.01); *C09J 11/06* (2013.01); *C08K 5/37* (2013.01)

(58) Field of Classification Search
CPC ....... C08K 5/5313; C08K 5/5317; C08K 5/37
USPC .................................. 524/710, 723, 773, 745
See application file for complete search history.

(56) References Cited

U.S. PATENT DOCUMENTS

| | | | |
|---|---|---|---|
| 5,167,882 A | 12/1992 | Jacobine et al. | |
| 5,183,917 A * | 2/1993 | Maruyama .............. | C08F 28/02 558/251 |
| 5,208,281 A | 5/1993 | Glaser | |
| 5,270,439 A | 12/1993 | Maruyama et al. | |
| 5,371,181 A | 12/1994 | Glaser et al. | |
| 5,399,624 A | 3/1995 | Glaser et al. | |
| 5,459,175 A | 10/1995 | Woods et al. | |
| 2003/0195270 A1 | 10/2003 | Ishii et al. | |
| 2005/0154073 A1 | 7/2005 | Ishii et al. | |
| 2009/0286015 A1 | 11/2009 | Matsukawa et al. | |
| 2010/0215937 A1 | 8/2010 | Matsukawa et al. | |

FOREIGN PATENT DOCUMENTS

| | | |
|---|---|---|
| EP | 0 484 054 | 5/1992 |
| JP | 63-20255 | 4/1988 |
| JP | 2-113027 | 4/1990 |
| JP | 2-289622 | 11/1990 |
| JP | 5-155987 | 6/1993 |
| JP | 6-25417 | 2/1994 |
| JP | 6-306172 | 11/1994 |
| JP | 7-508556 | 9/1995 |
| JP | 2001-26608 | 1/2001 |
| JP | 2001-306172 | 11/2001 |
| JP | 2003-226718 | 8/2003 |
| JP | 2003-238904 | 8/2003 |
| JP | 2004-35734 | 2/2004 |
| JP | 2004035734 A * | 2/2004 |
| JP | 2005-298637 | 10/2005 |
| JP | 2007-269969 | 10/2007 |
| JP | 2007-291313 | 11/2007 |
| WO | 94/25496 | 11/1994 |

OTHER PUBLICATIONS

"Journal of Polymer Science: Part A", Polymer Chemistry, vol. 42, 2004, pp. 5301-5338.

* cited by examiner

*Primary Examiner* — Kelechi Egwim
(74) *Attorney, Agent, or Firm* — Greenblum & Bernstein, P.L.C.

(57) ABSTRACT

According to the present invention, a polymerizable composition having excellent storage stability can be provided by adding an acid that serves as a stabilizing agent and a free-radical polymerization inhibitor to a polymerizable composition that contains a polythiol compound and an enic compound having a phenylthio backbone as monomer components. In the present invention, an embodiment in which the acid is at least one compound having a protonic-acid-type functional group which is selected from phosphoric acid, phosphonic acid, phosphinic acid, sulfonic acid, sulfoneimide and carboxylic acid is preferred.

9 Claims, No Drawings

POLYMERIZABLE COMPOSITION, AND CURED ARTICLE

TECHNICAL FIELD

The present invention relates to a polymerizable composition having practically sufficient storage stability, which has good optical characteristics regarding refractive index, transparency, etc. and can provide a cured product suitably used for an optical material such as an optical adhesive and an optical resin.

BACKGROUND ART

A copolymerization reaction between a compound having an ethylenic carbon-carbon double bond (hereinafter referred to as the "enic compound") and a thiol compound (hereinafter referred to as the "ene-thiol reaction") and a copolymer thereof are useful techniques well known in the art. The ene-thiol reaction is progressed by light and heat even if no polymerization initiator is used, but as a practical curing method, a photo-curing method or thermal curing method using a radical polymerization initiator is widely used. The ene-thiol reaction has characteristics such as a high reaction rate, little influence of oxygen inhibition and low cure shrinkage. For this reason, intended use as a rapid curing resin such as a coating material, a seal material, an encapsulation material and an adhesive, intended use for a molded product such as an optical resin, etc. have been proposed (Patent Document 1, Non-patent Document 1, etc.). Particularly, a polymerizable composition consisting of an enic compound and a thiol compound having a high refractive index has been proposed to be applied to an optical material having a high refractive index (Patent Documents 2, 3, etc.).

When a polymerizable composition comprising a polythiol compound and an enic compound having a phenylthio backbone is polymerized and cured, a cured product obtained has a particularly high refractive index, and therefore such a polymerizable composition is useful as an optical material. Patent Document 4 reports a polymerizable composition having a high refractive index using 4,4'-bis(methacryloylthio)diphenylsulfide (hereinafter referred to as "MPSMA") which is a representative phenylthio(meth)acrylate compound. However, a composition obtained by simply dissolving an enic compound having a phenylthio backbone in thiol is unstable even in a cool dark place, a thermal polymerization reaction thereof proceeds and the viscosity increases, and therefore, there is a practical problem that such a composition cannot be preserved for a long period of time. For this reason, the development of a method for stably preserving a polymerizable composition comprising a thiol compound and an enic compound having a phenylthio backbone had been desired.

During use of an ene-thiol composition, temporal stability thereof is very important, and various stabilization methods such as reduction of acid value, a metal ion and an inorganic ion (Patent Documents 5-7) and addition of a stabilizer such as nitrone-based, nitroxide-based and nitroso-based compounds (Patent Documents 8 and 9), a quinone-based compound (Patent Document 10), an iodine-based compound (Patent Document 11) and a phosphorus-based compound (Patent Document 12) have been reported. However, the reactivity of the ene-thiol composition significantly varies depending on the molecular structure of a monomer, particularly an enic compound, and the effective stabilizer also varies, and therefore, it is difficult to infer the effect of a stabilizer from already-known reported examples.

PRIOR ART DOCUMENTS

Patent Documents

Patent Document 1: Japanese Publication for Opposition No. S63-20255
Patent Document 2: Japanese Laid-Open Patent Publication No. H02-289622
Patent Document 3: Japanese Laid-Open Patent Publication No. 2005-298637
Patent Document 4: Japanese Laid-Open Patent Publication No. 2003-226718
Patent Document 5: Japanese Laid-Open Patent Publication No. H06-306172
Patent Document 6: Japanese National-phase PCT Publication No. H07-508556
Patent Document 7: Japanese Laid-Open Patent Publication No. 2001-306172
Patent Document 8: Japanese Laid-Open Patent Publication No. H06-25417
Patent Document 9: Japanese Laid-Open Patent Publication No. 2007-269969
Patent Document 10: Japanese Laid-Open Patent Publication No. 2007-291313
Patent Document 11: Japanese Laid-Open Patent Publication No. H05-155987
Patent Document 12: Japanese Laid-Open Patent Publication No. 2004-35734

Non-Patent Documents

Non-patent Document 1: Journal of Polymer Science: Part A: Polymer Chemistry, Vol. 42, 5301-5338 (2004)

SUMMARY OF THE INVENTION

Problems to be Solved by the Invention

The aforementioned ene-thiol composition having a high refractive index, which comprises a polythiol compound and an enic compound having a phenylthio backbone, has low storage stability because polymerization thereof rapidly proceeds even in a dark place at room temperature. When a nitroso compound that exhibits stabilization effect in many cases is added to an ene-thiol composition, it exhibits stabilization effect, but the stability of the ene-thiol composition is practically insufficient. Further, in the case where a quinone-based stabilizing agent, an iodine-based stabilizing agent or a phosphorus-based stabilizing agent (there is a report that these stabilizing agents stabilized an unstable ene-thiol composition) was used solely, and in the case where any of these stabilizing agents was used in combination with a nitroso compound, practically sufficient stabilization effect was not obtained. Note that the above-described ene-thiol composition was relatively stable under an inert atmosphere, but it is practically difficult to maintain an inert atmosphere constantly. Thus, there are problems that a polymerizable composition comprising a polythiol compound and an enic compound having a phenylthio backbone has poor thermal stability though it generally has a high refractive index and therefore is useful as an optical material, and that it is difficult to preserve the composition for a long period of time even when an already-known stabilizing agent is used. Therefore, it is considered that if a polymerizable composition comprising a polythiol compound and an enic compound having a phenylthio backbone having practically sufficient thermal stability is provided, it will lead to the development of a novel optical material having a high refractive index.

Means for Solving the Problems

The present inventors found that, by using an acid compound that serves as a stabilizing agent and a free-radical polymerization inhibitor in combination with a polymerizable composition comprising a polythiol compound and an enic compound having a phenylthio backbone which is useful as a curable composition having a high refractive index, the storage stability of the polymerizable composition is significantly improved and it is possible to impart practically sufficient stability, wherein the polymerizable composition can be preserved at room temperature for about 1 month. Note that the free-radical polymerization inhibitor as used herein means overall radical polymerization inhibitors having radical trapping ability. Embodiments of the present invention are as described below.
<1> A polymerizable composition, which comprises a polythiol compound and an enic compound having a phenylthio backbone as monomer components, and which further comprises an acid that serves as a stabilizing agent and a free-radical polymerization inhibitor.
<2> The polymerizable composition according to item <1>, wherein the enic compound having a phenylthio backbone is a compound represented by general formula below:

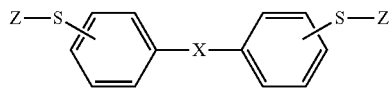

wherein: X represents any chemical structure; Z represents a (meth)acryloyl group, a vinyl group or an allyl group; and a benzene ring site may have a substituent.
<3> The polymerizable composition according to item <1> or <2>, wherein the acid is at least one compound having a protonic-acid-type functional group which is selected from phosphoric acid, phosphonic acid, phosphinic acid, sulfonic acid, sulfoneimide and carboxylic acid.
<4> The polymerizable composition according to any one of items <1> to <3>, wherein the acid content is 0.01 to 10 parts by mass relative to 100 parts by mass of the monomer components.
<5> The polymerizable composition according to any one of items <1> to <4>, wherein the free-radical polymerization inhibitor is at least one compound selected from the group consisting of a nitroso compound, a nitrone compound and a nitroxide compound.
<6> The polymerizable composition according to item <5>, wherein the free-radical polymerization inhibitor is an N-nitrosophenylhydroxylamine salt derivative.
<7> The polymerizable composition according to item <6>, wherein the content of the N-nitrosophenylhydroxylamine salt derivative is 0.001 to 1 parts by mass relative to 100 parts by mass of the monomer components.
<8> A cured product obtained by polymerizing the polymerizable composition according to any one of items <1> to <7>.
<9> An adhesive comprising the polymerizable composition according to any one of items <1> to <7>.

Advantageous Effect of the Invention

According to the present invention, the storage stability of a polymerizable composition comprising a polythiol compound and an enic compound having a phenylthio backbone can be significantly improved.

EMBODIMENTS FOR CARRYING OUT THE INVENTION

In the present invention, to a polymerizable composition comprising at least one polythiol compound (hereinafter sometimes referred to as "Component A") and at least one enic compound having a phenylthio backbone (hereinafter sometimes referred to as "Component B"), an acid (hereinafter sometimes referred to as "Component C") and a free-radical polymerization inhibitor (hereinafter sometimes referred to as "Component D") are added, thereby providing a polymerizable composition having practically sufficient stability. Another polymerizable compound, a solvent, a plasticizer, etc. may be used in combination therewith, for example, in order to adjust physical properties of the polymerizable composition or a cured product thereof. In addition, another polymerization inhibitor, a photopolymerization initiator, a thermal polymerization initiator, an antioxidant, a light stabilizer, an ultraviolet absorber, an adherence agent, a mold release agent, a pigment, a dye, etc. can be added thereto according to need.

The polythiol compound (Component A) is a compound having a plurality of thiol groups in one molecule. The compound generally has a high refractive index because it has a sulfur atom that has high atomic refraction, and radical addition or anionic addition to various unsaturated bond compounds is progressed thereby, and therefore, the compound is suitably used as a component of a polymerizable composition having a high refractive index. Component A may be used solely, or two or more types of compounds corresponding to Component A may be used in combination, or a monofunctional thiol may be used in combination therewith. The content of Component A is not particularly limited, but the number of thiol groups in the composition is preferably 0.05 to 2 equivalents, and particularly preferably 0.2 to 1.5 equivalents relative to the number of carbon-carbon double bond groups. When the amount of Component A is small, characteristics of an ene-thiol composition such as rapid curing, little influence of oxygen inhibition and low cure shrinkage are not sufficiently exerted, and when the amount of Component A is large, many unreacted thiol groups remain even after the composition is cured.

When using as an optical material having a high refractive index, Component A is added preferably in an amount of 5 to 80 parts by mass, and more preferably in an amount of 10 to 70 parts by mass relative to 100 parts by mass of monomers. Note that the monomers in this case mean Component A, Component B and other polymerizable compounds contained.

Specific examples of preferred Component A include: alkyl polythiols such as 2-mercaptomethyl-1,5-dimercapto-3-thiapentane, 2,4-bis(mercaptomethyl)-1,5-dimercapto-3-thiapentane, 4-mercaptomethyl-1,8-dimercapto-3,6-dithiaoctane, 4,8-bis(mercaptomethyl)-1,11-dimercapto-3,6,9-trithiaundecane, 4,7-bis(mercaptomethyl)-1,11-dimercapto-3,6,9-trithiaundecane, 5,7-bis(mercaptomethyl)-1,11-dimercapto-3,6,9-trithiaundecane, 1,4-dimercaptomethyldithian and bis(2-mercaptoethyl)sulfide; aromatic polythiols such as benzenedithiol, xylylene dithiol and benzenetrithiol; and heteroatom-containing polythiols such as 2,5-dimercapto-1,3,4-thiadiazole.

Further, 4-mercaptomethyl-3,6-dithia-1,8-octanedithiol, a mixture of 4,8-dimercaptomethyl-1,11-dimercapto-3,6,9-trithiaundecane, 4,7-dimercaptomethyl-1,11-dimercapto-3, 6,9-trithiaundecane and 5,7-dimercaptomethyl-1,11-dimercapto-3,6,9-trithiaundecane, 1,4-dimercaptomethyldithian, bis(2-mercaptoethyl)sulfide and pentaerythritol tetrakis-thiopropionate used in the working examples described later are some examples of polythiol compounds which can be suitably used in the present invention.

The enic compound having a phenylthio backbone (Component B) is a compound represented by general formula below:

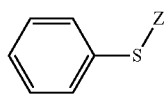

wherein: Z represents an unsaturated bond structure such as a (meth)acryloyl group, a vinyl group and an allyl group; and a benzene ring site may have a substituent. Examples of particularly preferred enic compounds having a phenylthio backbone include a compound represented by general formula below:

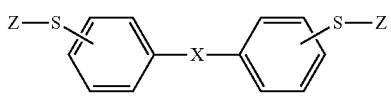

wherein: X represents any chemical structure; Z represents an unsaturated bond structure such as a (meth)acryloyl group, a vinyl group and an allyl group; and a benzene ring site may have a substituent. The X site may have any structure, but when it is sulfide, sulfoxide, sulfone, ether, carbonate or a structure without substitution (biphenyl structure), a cured product obtained has a particularly high refractive index, and it is preferable. Similarly, regarding the substituent at the benzene ring site, halogen, alkyl having 4 or less carbon atoms or ether, or a structure without substitution is preferred from the viewpoint of the refractive index. These compounds generally have a refractive index higher than those of usual enic compounds because the compounds have a phenylthio backbone that has high molecular refraction, and therefore, the compounds are suitably used as a component of a polymerizable composition having a high refractive index. Component B may be used solely, or two or more types of compounds corresponding to Component B may be used in combination. When using as an optical material having a high refractive index, Component B is added preferably in an amount of 5 parts by mass or more, and more preferably in an amount of 10 to 50 parts by mass relative to 100 parts by mass of the monomers. When the amount of Component B is small, the improvement level of the refractive index becomes low. In this regard, even in the case where the amount of Component B is less than 5 parts by mass, during preservation in a dark place, a reaction between Component B having high reactivity and thiol proceeds preferentially to cause denaturation of the composition, and therefore, the stabilizing agent of the present invention is useful. Note that the monomers in this case mean Component A, Component B and other polymerizable compounds contained (hereinafter just referred to as "the monomers").

Specific examples of preferred Component B include: compounds having a monofunctional phenylthio backbone such as benzene thioacrylate, benzene thiomethacrylate, (vinylthio)benzene and (allylthio)benzene; and bifunctional phenylthio sulfide compounds such as 4,4'-bis(acryloylthio) diphenylsulfide, 4,4'-bis(methacryloylthio)diphenylsulfide, 4,4'-bis(vinylthio)diphenylsulfide and 4,4'-bis(allylthio)diphenylsulfide, and sulfoxide and sulfone compounds which are oxidized bodies thereof.

Further, 4,4'-bis(methacryloylthio)diphenylsulfide used in the working examples described later is one example of the enic compound having a phenylthio backbone which can be suitably used in the present invention.

As the acid (Component C), any type of acid such as protonic acid, Lewis acid, organic acid and inorganic acid can be used as long as the acid has solubility of the ene-thiol composition. Component C may be used solely, or two or more types of compounds corresponding to Component C may be used in combination. Further, an acidic functional group may be introduced by reacting a reactive acid compound such as vinyl sulfonic acid with another component of the composition in advance. Specific examples of Component C include: alkyl sulfonic acids such as methanesulfonic acid, trifluoromethanesulfonic acid, ethane sulfonic acid, camphorsulfonic acid and dodecyl sulfuric acid; aromatic sulfonic acids such as benzenesulfonic acid, p-toluenesulfonic acid and dodecylbenzenesulfonic acid; sulfonimides such as methanesulfonimide and trifluoromethanesulfonimide; phosphoric acids, phosphonic acids and phosphinic acids such as KAYAMER PM-2 and PM-21 (both are methacrylate phosphate, manufactured by Nippon Kayaku Co., Ltd.), methanephosphonic acid, benzenephosphonic acid and benzenephosphinic acid; carboxylic acids such as trifluoroacetic acid and oxalic acid; acids having an acidic hydroxyl group such as phenol, picric acid and squaric acid; Lewis acids such as boron trifluoride, triphenyl borate and triethoxyaluminium; polyacids such as molybdic acid, silicomolybdic acid and phosphotungstic acid; and inorganic acids such as sulfuric acid and hydrogen chloride.

Among these acids, at least one compound having a protonic-acid-type functional group which is selected from phosphoric acid, phosphonic acid, phosphinic acid, sulfonic acid, sulfoneimide and carboxylic acid is preferred.

In many cases, inorganic acid has low solubility of the ene-thiol composition, and weak protonic acid is less likely to effectively act as an acid in an organic monomer. Therefore, organic strong acids such as organic sulfonic acid, organic phosphoric (phosphorous) acid and sulfoneimide are particularly preferred.

Further, (+)-10-camphorsulfonic acid, p-toluenesulfonic acid monohydrate, benzenesulfonic acid, trifluoromethanesulfonimide, oxalic acid (anhydrous), benzenephosphonic acid, benzenephosphinic acid, dodecylbenzenesulfonic acid, and KAYAMER PM-21 which is methacrylate phosphate used in the working examples described later are some examples of acids which can be suitably used in the present invention.

The optimum amount of the acid to be added varies depending on the acid strength and the molecular weight of the acid, but in the case of a strong acid having a PKa value of 2 or less such as a sulfonic acid derivative, the amount thereof to be added is preferably 0.01 to 1 parts by mass, and particularly preferably 0.02 to 0.5 parts by mass relative to 100 parts by mass of the monomers. When using a moderately strong acid having a PKa value of 2 to 4 such as phosphoric acid, the amount thereof to be added is preferably 0.05 to 10 parts by mass, and particularly preferably 0.1 to 5 parts by mass. In the case where the adding amount is small, the effect of polymerization inhibition is not sufficient, and in the case where the adding amount is large, the ene-thiol composition becomes destabilized, and therefore, in both the cases, it is difficult to obtain practically sufficient thermal stability.

As in the case of usual ene-thiol compositions, as the free-radical polymerization inhibitor (Component D), a general radical scavenger can be used. N-oxo compounds generally have high stabilization effect, and among them, an N-nitrosophenylhydroxylamine salt derivative has high stabilization effect and therefore is preferred. Further, N-nitrosophenylhydroxylamine aluminum salt, which has relatively high solubility in many monomers, is particularly preferred. As in the case of general ene-thiol compositions, remarkable stabilization effect can be obtained even by the addition in a small amount, about 0.001 parts by mass relative to 100 parts by mass of the monomers. In the case of the addition in a large amount, the stability of the ene-thiol composition is slightly reduced and color tone deterioration is caused. Therefore, the adding amount is preferably 0.001 to 1 parts by mass, and particularly preferably 0.002 to 0.5 parts by mass relative to 100 parts by mass of the monomers. However, even when Component D is added in an amount beyond the above-described range, it does not lead to significant reduction in the stability of the polymerizable composition. Specific examples of Component D include: hydroquinones such as hydroquinone, methylhydroquinone, t-butylhydroquinone and hydroquinone monomethyl ether; nitroso compounds such as p-nitrosophenol, nitrosobenzene, N-nitrosodiphenylamine, isononyl nitrite, N-nitrosocyclohexylhydroxylamine, N-nitrosophenylhydroxylamine, N,N'-dinitrosophenylenediamine, or salts thereof; nitrone compounds such as α-phenyl-N-t-butylnitrone and α-naphthyl-N-t-butylnitrone; and nitroxide compounds such as 2,2,6,6-tetramethyl-1-piperidinoxide (TEMPO) and 4-hydroxy-2,2,6,6-tetramethyl-1-piperidinoxide.

Among these free-radical polymerization inhibitors, at least one compound selected from the group consisting of a nitroso compound, a nitrone compound and a nitroxide compound is preferred.

Further, N-nitrosophenylhydroxylamine aluminum salt, t-butyl-α-phenylnitrone and 2,2,6,6-tetramethyl-1-piperidinoxide (TEMPO) used in the working examples described later are some examples of free-radical polymerization inhibitors which can be suitably used in the present invention.

Note that when the polymerizable composition obtained according to the present invention is used as an optical material having a high refractive index, it may be practically advantageous to add an enic compound other than Component B thereto for the purpose of adjustment of physical properties, dissolution of solid components, dilution of the composition, etc., and as the compound to be used for this, a low-colored compound having a high refractive index that can be copolymerized with thiol, such as an enic compound having an aromatic ring or hetero ring is preferred. Specific examples of preferred enic compounds other than Component B include triallyl isocyanurate, triallyl cyanurate, diallyl phthalate, diallyl isophthalate, diallyl terephthalate, triallyl trimellitate, tetraallyl pyromellitate, phenyl(meth)acrylate, 2-phenoxyethyl(meth)acrylate, o-phenylphenol(meth)acrylate and 2-(o-phenylphenoxy)ethyl(meth)acrylate. These compounds may be used solely, or two or more of them may be used in combination.

Further, in order to cure the polymerizable composition obtained according to the present invention, various polymerization initiators can be mixed therewith. The polymerization initiator is not particularly limited, and general radical polymerization initiators can be used. Specific examples of the polymerization initiator include: photopolymerization initiators such as 2,2-methoxy-1,2-diphenylethane-1-one, 1-hydroxy-cyclohexyl phenyl ketone, 2-hydroxy-2-methyl-1-phenylpropane-1-one, 2-methyl-1-[4-(methylthio)phenyl]-2-morpholino propan-1-one, 2-benzyl-2-dimethylamino-1-(4-morpholino phenyl)-butanone-1, bis(2,4,6-trimethyl benzoyl)-phenylphosphine oxide and 2,4,6-trimethylbenzoyl-diphenyl-phosphine oxide; and thermal polymerization initiators such as di-t-butyl peroxide, benzoyl peroxide, benzoyl tolyl peroxide, 2,2'-azobis(isobutyronitrile) and 2,2'-azobis(2,4-dimethyl valeronitrile). These compounds may be used solely, or two or more of them may be used in combination. The content of the polymerization initiator is not particularly limited, but is preferably 0.1 to 10 parts by mass, and more preferably 0.5 to 5 parts by mass relative to 100 parts by mass of the polymerizable composition.

EXAMPLES

Hereinafter, the present invention will be specifically described by way of illustrative examples, but the present invention is not limited thereto.

4-mercaptomethyl-3,6-dithia-1,8-octanedithiol (Component A: hereinafter referred to as "GST") was synthesized according to Japanese Patent No. 3048929, a mixture of 4,8-dimercaptomethyl-1,11-dimercapto-3,6,9-trithiaundecane, 4,7-dimercaptomethyl-1,11-dimercapto-3,6,9-trithiaundecane and 5,7-dimercaptomethyl-1,11-dimercapto-3,6,9-trithiaundecane (Component A: hereinafter referred to as "DDT") was synthesized according to Japanese Patent No. 3444682, and 1,4-dimercaptomethyldithian (Component A: hereinafter referred to as "DMMD") was synthesized according to Japanese Patent No. 2895987, and these compounds were used in experiments.

Bis(2-mercaptoethyl)sulfide (Component A: hereinafter referred to as "DMDS") was obtained from Tokyo Chemical Industry Co., Ltd., pentaerythritol tetrakis-thiopropionate (Component A: hereinafter referred to as "PETP") was obtained from Yodo Kagaku Co., Ltd., 4,4'-bis(methacryloylthio)diphenylsulfide (Component B: hereinafter referred to as "MPSMA") was obtained from Sumitomo Seika Chemicals Co., Ltd., triallyl isocyanurate (hereinafter referred to as "TAIL") was obtained from Evonik Degussa Japan Co., Ltd., a mixture of 9,9-bis[4-(2-acryloyloxyethoxy)phenyl]fluorene and a low-viscosity acrylic monomer (hereinafter referred to as "F5003") was obtained from Osaka Gas Chemicals Co., Ltd., 2,4,6-trimethylbenzoyl-diphenyl-phosphine oxide (hereinafter referred to as "TPO") was obtained from BASF Japan Ltd., N-nitrosophenylhydroxylamine aluminum salt (Component D: hereinafter referred to as "Q-1301") was obtained from Wako Pure Chemical Industries, Ltd., KAYAMER PM-21 which is methacrylate phosphate (Component C: hereinafter referred to as "PM-21") was obtained from Nippon Kayaku Co., Ltd., and the other compounds were obtained from Tokyo Chemical Industry Co., Ltd. These compounds were directly used in the experiments.

For measuring the viscosity, a rotating-type viscometer (DV-II+PRO manufactured by BROOKFIELD) was used, and the measurement was performed at 20° C.

For measuring the refractive index, an Abbe refractometer (NAR-3T manufactured by Atago Co., Ltd.) was used.

For photo-curing of the ene-thiol composition, a light source device for ultraviolet curing (UE01.51-3A/BM-E1S manufactured by Eye Graphics Co., Ltd.) was used.

Examples 1-7

One polythiol compound selected from DMDS, DMMD, GST, DDT and PETP (each Component A) was weighed, and to 20 parts by mass of the polythiol compound, 0.1 parts by mass of Q-1301 (Component D) as a free-radical polymerization inhibitor was added to be dissolved therein. Further, 60 parts by mass of one enic compound selected from F5003 and TAIC as a dilution component and 0.1 parts by mass of (+)-10-camphorsulfonic acid (Component C: hereinafter referred to as "camphorsulfonic acid") as a stabilizing agent were added thereto to be dissolved therein with stirring. Moreover, 20 parts by mass of MPSMA (Component B) as phenylthio(meth)acrylate was added thereto, and the mixture was stirred until it became a homogeneous solution, thereby preparing a polymerizable ene-thiol composition. The viscosity of the composition was measured, and then it was transferred to a glass container and allowed to stand at 60° C. for 24 hours. The viscosity of the composition was measured again, and the stability of the ene-thiol composition was evaluated based on change in the viscosity. It is considered that the smaller the change in the viscosity is, the stabler the composition is. Furthermore, 1 part by mass of TPO as a photopolymerization initiator was dissolved in the prepared polymerizable ene-thiol composition, and the mixture was sandwiched by glass substrates to make a thin film having a thickness of about 200 μm. Then the film was subjected to light irradiation for 10 seconds using a high-pressure mercury lamp as a light source (10 mW/m$^2$), thereby curing the composition. The refractive index of the obtained cured film of the ene-thiol composition was measured at the sodium D line at 20° C.

Comparative Examples 1-7

A polymerizable ene-thiol composition was prepared in a manner similar to that in Examples 1-7, except that only 0.1 parts by mass of Q-1301 (Component D) as a free-radical polymerization inhibitor was added and camphorsulfonic acid (Component C) was not added, and the stability of the composition was evaluated. In the case of a composition which gelated, it was impossible to measure the viscosity thereof because of high viscosity, and it was judged as having significantly low stability.

Comparative Examples 8-14

A polymerizable ene-thiol composition was prepared in a manner similar to that in Examples 1-7, except that Q-1301 (Component D) and camphorsulfonic acid (Component C) were not added, and the stability of the composition was evaluated. In the case of a composition which gelated, it was impossible to measure the viscosity thereof because of high viscosity, and it was judged as having significantly low stability.

The results obtained in Examples 1-7 and Comparative Examples 1-14 are shown in Tables 1-3.

TABLE 1

Storage stability test results (combined use and addition of Q-1301 and camphorsulfonic acid)

| | Liquid composition (/parts by mass) | | | | | | | | | | Physical property test | | |
|---|---|---|---|---|---|---|---|---|---|---|---|---|---|
| | Component A (polythiol) | | | | | Component B | Dilution component | | Stabilizing agent | | Stability test (viscosity/cPs) | | |
| | DMDS | DMMD | GST | DDT | PETP | MPSMA | F5003 | TAIC | Q-1301 | Camphor-sulfonic acid | Beginning | 1 day later | Refractive index (nD) |
| Example 1 | 20 | 0 | 0 | 0 | 0 | 20 | 60 | 0 | 0.1 | 0.1 | 200 | 200 | 1.63 |
| Example 2 | 0 | 20 | 0 | 0 | 0 | 20 | 60 | 0 | 0.1 | 0.1 | 1100 | 1200 | 1.64 |
| Example 3 | 0 | 0 | 20 | 0 | 0 | 20 | 60 | 0 | 0.1 | 0.1 | 700 | 800 | 1.64 |
| Example 4 | 0 | 0 | 0 | 20 | 0 | 20 | 60 | 0 | 0.1 | 0.1 | 1400 | 1400 | 1.64 |
| Example 5 | 0 | 0 | 0 | 0 | 20 | 20 | 60 | 0 | 0.1 | 0.1 | 2000 | 2100 | 1.62 |
| Example 6 | 0 | 0 | 20 | 0 | 0 | 20 | 0 | 60 | 0.1 | 0.1 | 200 | 200 | 1.61 |
| Example 7 | 0 | 0 | 0 | 20 | 0 | 20 | 0 | 60 | 0.1 | 0.1 | 300 | 300 | 1.61 |

TABLE 2

Storage stability test results (addition of only Q-1301)

| | Liquid composition (/parts by mass) | | | | | | | | | | Stability test (viscosity/cPs) | |
|---|---|---|---|---|---|---|---|---|---|---|---|---|
| | Component A (polythiol) | | | | | Component B | Dilution component | | Stabilizing agent | | | |
| | DMDS | DMMD | GST | DDT | PETP | MPSMA | F5003 | TAIC | Q-1301 | Camphorsulfonic acid | Beginning | 1 day later |
| Comparative Example 1 | 20 | 0 | 0 | 0 | 0 | 20 | 60 | 0 | 0.1 | 0 | 200 | gelated |
| Comparative Example 2 | 0 | 20 | 0 | 0 | 0 | 20 | 60 | 0 | 0.1 | 0 | 1100 | gelated |
| Comparative Example 3 | 0 | 0 | 20 | 0 | 0 | 20 | 60 | 0 | 0.1 | 0 | 700 | gelated |
| Comparative Example 4 | 0 | 0 | 0 | 20 | 0 | 20 | 60 | 0 | 0.1 | 0 | 1400 | gelated |
| Comparative Example 5 | 0 | 0 | 0 | 0 | 20 | 20 | 60 | 0 | 0.1 | 0 | 2000 | gelated |

TABLE 2-continued

Storage stability test results (addition of only Q-1301)

| | Liquid composition (/parts by mass) | | | | | | | | | | Stability test (viscosity/cPs) | |
|---|---|---|---|---|---|---|---|---|---|---|---|---|
| | Component A (polythiol) | | | | | Component B | Dilution component | | | Stabilizing agent | | |
| | | | | | | | | | | Camphorsulfonic | 1 day | |
| | DMDS | DMMD | GST | DDT | PETP | MPSMA | F5003 | TAIC | Q-1301 | acid | Beginning | later |
| Comparative Example 6 | 0 | 0 | 20 | 0 | 0 | 20 | 0 | 60 | 0.1 | 0 | 200 | gelated |
| Comparative Example 7 | 0 | 0 | 0 | 20 | 0 | 20 | 0 | 60 | 0.1 | 0 | 300 | 500 |

TABLE 3

Storage stability test results (without addition of stabilizing agent)

| | Liquid composition (/parts by mass) | | | | | | | | | | Stability test (viscosity/cPs) | |
|---|---|---|---|---|---|---|---|---|---|---|---|---|
| | Component A (polythiol) | | | | | Component B | Dilution component | | | Stabilizing agent | | |
| | | | | | | | | | | Camphorsulfonic | 1 day | |
| Run | DMDS | DMMD | GST | DDT | PETP | MPSMA | F5003 | TAIC | Q-1301 | acid | Beginning | later |
| Comparative Example 8 | 20 | 0 | 0 | 0 | 0 | 20 | 60 | 0 | 0 | 0 | 200 | gelated |
| Comparative Example 9 | 0 | 20 | 0 | 0 | 0 | 20 | 60 | 0 | 0 | 0 | 1100 | gelated |
| Comparative Example 10 | 0 | 0 | 20 | 0 | 0 | 20 | 60 | 0 | 0 | 0 | 700 | gelated |
| Comparative Example 11 | 0 | 0 | 0 | 20 | 0 | 20 | 60 | 0 | 0 | 0 | 1400 | gelated |
| Comparative Example 12 | 0 | 0 | 0 | 0 | 20 | 20 | 60 | 0 | 0 | 0 | 2000 | gelated |
| Comparative Example 13 | 0 | 0 | 20 | 0 | 0 | 20 | 0 | 60 | 0 | 0 | 200 | gelated |
| Comparative Example 14 | 0 | 0 | 0 | 20 | 0 | 20 | 0 | 60 | 0 | 0 | 300 | gelated |

From Examples 1-7 and Comparative Examples 1-14, it was found that the stability of ene-thiol compositions containing MPSMA (Component B) is significantly improved by combined use of camphorsulfonic acid (Component C) and Q-1301 (Component D). Moreover, a cured product having a high refractive index was successfully obtained by photo-curing the stabilized composition.

Examples 8-14

GST (Component A) was weighed, and to 30 parts by mass of the component, 0.1 parts by mass of Q-1301 (Component D) was added to be dissolved therein. Further, 50 parts by mass of F5003, and 0.1 parts by mass of one strongly acidic stabilizing agent selected from camphorsulfonic acid, p-toluenesulfonic acid monohydrate, benzenesulfonic acid, trifluoromethanesulfonimide, oxalic acid (anhydrous), benzenephosphonic acid and benzenephosphinic acid (all are Component C) were added thereto to be dissolved therein with stirring. Moreover, 20 parts by mass of MPSMA (Component B) was added thereto, and the mixture was stirred until it became a homogeneous solution, thereby preparing a polymerizable ene-thiol composition. The viscosity of the composition was measured, and then it was put in a glass container airtightly and allowed to stand at 40° C. for 1 hour to 10 days. After that, the viscosity of the composition was measured again, and the stability of the composition was evaluated based on change in the viscosity.

Comparative Examples 15-21

A polymerizable ene-thiol composition was prepared in a manner similar to that in Examples 8-14, except that 0.1 parts by mass of one stabilizing agent selected from methylhydroquinone, triphenyl borate, tetrabutylammonium iodide, benzoquinone, triethyl phosphite and triphenylphosphine was used in combination with Q-1301 (Component D) or no stabilizing agent was added to be used in combination with Q-1301, and the stability of the composition was evaluated.

The results obtained in Examples 8-14 and Comparative Examples 15-21 are shown in Tables 4 and 5. Further, PKa values of a part of the acids in water are shown as reference values.

TABLE 4

Change in storage stability depending on difference of the type of stabilizing agent

| | Stabilizing agent | PKa | Stability test (viscosity/cPs) | | | | | |
|---|---|---|---|---|---|---|---|---|
| | | | Beginning | 1 hour | 1 day | 4 days | 6 days | 10 days |
| Example 8 | Camphorsulfonic acid | <0 | 500 | 500 | 500 | 500 | 600 | 600 |
| Example 9 | p-toluenesulfonic acid monohydrate | <0 | 500 | 500 | 500 | 600 | 600 | 600 |
| Example 10 | Benzenesulfonic acid | <0 | 500 | 500 | 600 | 600 | 600 | 700 |
| Example 11 | Trifluoromethanesulfonimide | <0 | 500 | 500 | 500 | 600 | 600 | 700 |
| Example 12 | Oxalic acid (anhydrous) | 1.3 | 500 | 500 | 500 | 600 | 700 | 800 |
| Example 13 | Benzenephosphonic acid | 2 | 500 | 500 | 500 | 600 | 700 | 800 |
| Example 14 | Benzenephosphinic acid | | 500 | 500 | 500 | 600 | 700 | 800 |

0.1 parts by mass of Q-1301 was used in combination in each case.

TABLE 5

Change in storage stability depending on difference of the type of stabilizing agent

| | Stabilizing agent | Stability test (viscosity/cPs) | | | | | |
|---|---|---|---|---|---|---|---|
| | | Beginning | 1 hour | 1 day | 4 days | 6 days | 10 days |
| Comparative Example 15 | Methylhydroquinone | 500 | 500 | 500 | 600 | 1100 | 5200 |
| Comparative Example 16 | Triphenyl borate | 500 | 900 | gelated | | | |
| Comparative Example 17 | Tetrabutylammonium iodide | 500 | 1000 | gelated | | | |
| Comparative Example 18 | Benzoquinone | 500 | 5600 | gelated | | | |
| Comparative Example 19 | Triethyl phosphite | 500 | 5700 | gelated | | | |
| Comparative Example 20 | Triphenylphosphine | 500 | 5700 | gelated | | | |
| Comparative Example 21 | Without addition | 500 | 5600 | gelated | | | |

0.1 parts by mass of Q-1301 was used in combination in each case.

When a strong acid was added, remarkable stabilization effect of the composition was obtained. It is known that in a general chemical reaction, 10° C. rise in temperature has the effect of about 2-fold acceleration, and in Examples 8-14, the viscosity did not significantly change at 40° C. over about one week. Therefore, it is expected that the composition can be stably preserved at 20° C. over about one month, and it can be judged that practically sufficient stability was obtained. In Comparative Example 15, when methylhydroquinone was added, the composition showed stability equivalent to that of the composition to which a strong acid was added till day 4 of the test, but after that, the viscosity increased rapidly. When a weak Lewis acid, specifically, triphenyl borate or tetrabutylammonium iodide was added, slight stabilization effect was shown, but the effect was smaller compared to the cases of the strong acids used in Examples 8-14. When a quinone-based or phosphine-based compound, which is a polymerization inhibitor used for a general ene-thiol composition, was added, stabilization effect was not shown.

Examples 15-17

GST (Component A) was weighed, and to 30 parts by mass of the component, 0.1 parts by mass of one free-radical polymerization inhibitor selected from Q-1301, t-butyl-α-phenylnitrone and 2,2,6,6-tetramethyl-1-piperidinoxide (TEMPO) (all are Component D) and 0.1 parts by mass of camphorsulfonic acid (Component C) were added to be dissolved therein with stirring. Further, 50 parts by mass of F5003 and 20 parts by mass of MPSMA (Component B) were added thereto and mixed with stirring, thereby preparing a polymerizable ene-thiol composition. The viscosity of the composition was measured, and then it was transferred to a glass container and allowed to stand at 40° C. for 1 hour and 1 day, and then the viscosity of the composition was measured again. The stability of the composition was evaluated based on change in the viscosity.

Comparative Example 22

A polymerizable ene-thiol composition was prepared in a manner similar to that in Examples 15-17, except that no free-radical polymerization inhibitor was added, and the stability of the composition was evaluated.

The results obtained in Examples 15-17 and Comparative Example 22 are shown in Table 6.

TABLE 6

Change in storage stability depending on difference of the type of free-radical polymerization inhibitor

| | Free-radical polymerization inhibitor | Stability test (viscosity/cPs) | | |
|---|---|---|---|---|
| | | Beginning | 1 hour | 1 day |
| Example 15 | Q-1301 | 500 | 500 | 500 |
| Example 16 | t-butyl-α-phenylnitrone | 500 | 600 | 3200 |
| Example 17 | TEMPO | 500 | 600 | 2800 |
| Comparative Example 22 | Without addition | 500 | 3600 | gelated |

0.1 parts by mass of camphorsulfonic acid was used in combination in each case.

When Q-1301, t-butyl-α-phenylnitrone or TEMPO was added as a free-radical polymerization inhibitor, in each case, the effect of stabilizing the composition was obtained. Among these 3 types of free-radical polymerization inhibitors used, Q-1301 exerted the most potent effect.

Examples 18-34

GST (Component A) was weighed, and to 30 parts by mass of the component, 0.1 parts by mass of Q-1301 (Component D) was added to be dissolved therein. Further, 50 parts by mass of F5003 was added thereto to provide a homogeneous solution. To the solution, one acid (Component C) selected from 0.02 to 0.2 parts by mass of camphorsulfonic acid, 0.04 to 0.15 parts by mass of benzenesulfonic acid, 0.08 to 0.50 parts by mass of dodecylbenzenesulfonic acid (hereinafter referred to as "DBSA") and 0.1 to 5 parts by mass of KAYAMER PM-21 that is methacrylate phosphate (hereinafter referred to as "PM-21") was added and the mixture was stirred. After that, 20 parts by mass of MPSMA (Component B) was further added thereto and the mixture was mixed with stirring, thereby preparing a polymerizable ene-thiol composition. The viscosity of the composition was measured, and then it was transferred to a glass container and allowed to stand at 40° C. for 1 day and 15 days, and then the viscosity of the composition was measured again. The stability of the composition was evaluated based on change in the viscosity.

Examples 35-39

GST (Component A) was weighed, and to 30 parts by mass of the component, 0.002 to 0.5 parts by mass of Q-1301 (Component D) was added, and the mixture was stirred. Further, 50 parts by mass of F5003 and 0.1 parts by mass of camphorsulfonic acid (Component C) were added thereto, and the mixture was stirred. After that, 20 parts by mass of MPSMA (Component B) was added thereto and the mixture was mixed with stirring again, thereby preparing a polymerizable ene-thiol composition. The viscosity of the composition was measured, and then it was transferred to a glass container and allowed to stand at 40° C. for 1 day and 15 days, and then the viscosity of the composition was measured again. The stability of the composition was evaluated based on change in the viscosity.

The results obtained in Examples 18-34 and Examples 35-40 are shown in Tables 7 and 8.

TABLE 7

Change in storage stability depending on difference of the adding amount of acid

| | | | Stability test (viscosity/cPs) | | |
|---|---|---|---|---|---|
| Run | Q-1301 | Camphorsulfonic acid | Beginning | 1 day | 15 days |
| Example 18 | 0.10 | 0.02 (0.8) | 500 | 800 | 9800 |
| Example 19 | 0.10 | 0.05 (2) | 500 | 700 | 5000 |
| Example 20 | 0.10 | 0.10 (4) | 500 | 500 | 600 |
| Example 21 | 0.10 | 0.20 (9) | 500 | 500 | 700 |

| | | | Stability test (viscosity/cPs) | | |
|---|---|---|---|---|---|
| Run | Q-1301 | Benzenesulfonic acid | Beginning | 1 day | 15 days |
| Example 22 | 0.10 | 0.04 (2.5) | 500 | 600 | 3800 |
| Example 23 | 0.10 | 0.08 (5) | 500 | 500 | 600 |
| Example 24 | 0.10 | 0.10 (6) | 500 | 500 | 700 |
| Example 25 | 0.10 | 0.15 (9) | 500 | 500 | 900 |

| | Q-1301 | DBSA | Beginning | 1 day | 15 days |
|---|---|---|---|---|---|
| Example 26 | 0.10 | 0.08 (2.5) | 500 | 500 | 1600 |
| Example 27 | 0.10 | 0.10 (3) | 500 | 500 | 600 |
| Example 28 | 0.10 | 0.15 (5) | 500 | 500 | 600 |
| Example 29 | 0.10 | 0.50 (15) | 500 | 500 | 1900 |

| | Q-1301 | PM-21 | Beginning | 1 day | 15 days |
|---|---|---|---|---|---|
| Example 30 | 0.10 | 0.10 (2.5) | 500 | 500 | 3500 |
| Example 31 | 0.10 | 0.50 (12) | 500 | 500 | 900 |
| Example 32 | 0.10 | 1.0 (24) | 500 | 500 | 600 |
| Example 33 | 0.10 | 3.0 (70) | 500 | 500 | 600 |
| Example 34 | 0.10 | 5.0 (120) | 500 | 500 | 800 |
| ref. | 0.10 | 0 | 500 | gelated | — |

—: unmeasured
Values in parentheses in the column regarding the adding amount of acid are mol concentrations of acids (mmol/kg).

TABLE 8

Change in storage stability depending on difference of the adding amount of Q-1301

| | | | Stability test (viscosity/cPs) | | |
|---|---|---|---|---|---|
| Run | Q-1301 | Camphorsulfonic acid | Beginning | 1 day | 15 days |
| Example 35 | 0.002 | 0.10 | 500 | 500 | 700 |
| Example 36 | 0.01 | 0.10 | 500 | 500 | 600 |
| Example 37 | 0.05 | 0.10 | 500 | 500 | 600 |
| Example 38 | 0.20 | 0.10 | 500 | 500 | 600 |
| Example 39 | 0.50 | 0.10 | 500 | 500 | 700 |
| ref. | 0 | 0.10 | 500 | gelated | — |

—: unmeasured

In all the working examples, the stability was significantly improved compared to the case where only Q-1301 (Component D) or only camphorsulfonic acid (Component C) was used. When the adding amount of acid was small, the stability of the composition was relatively low, and when acid was added excessively, the stability of the composition at the time of storage for a long period of time was slightly lower. When using the sulfonic acid derivative, the stability of the composition correlated with the mol concentration of the added acid. The adding amount was particularly preferably 0.8 to 15 mmol/kg (0.02 to 0.5 parts by mass), and the optimum adding amount was about 3 to 6 mmol/kg. Further, when using PM-21 which is a phosphate compound having a PKa value higher than that of the sulfonic acid derivative and having low acid strength, the adding amount was particularly preferably 2.5 to 120 mmol/kg (0.1 to 5 parts by mass), and the optimum adding amount was about 24 to 70 mmol/kg (1 to 3 parts by mass). Thus, there was a tendency that the adding amount was larger than that of the sulfonic acid derivative. Further, in the range of Examples 35-39, a stable composition was obtained in all the cases, but in the cases where the adding amount of Q-1301 (Component D) was small (Example 35) and large (Example 39), the stability of the composition was slightly lower.

The invention claimed is:

1. A polymerizable composition, which comprises i) a polythiol compound and ii) an enic compound having a phenylthio backbone as monomer components, and which further comprises iii) an acid that serves as a stabilizing agent and iv) a free-radical polymerization inhibitor.

2. The polymerizable composition according to claim 1, wherein the enic compound having a phenylthio backbone is a compound represented by the formula below:

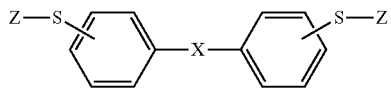

wherein X represents any chemical structure; Z represents a (meth)acryloyl group, a vinyl group or an allyl group; and a benzene ring site may have a substituent.

3. The polymerizable composition according to claim 1, wherein the acid is at least one compound having a protonic-acid-type functional group which is selected from phosphoric acid, phosphonic acid, phosphinic acid, sulfonic acid, sulfonimide and carboxylic acid.

4. The polymerizable composition according to claim 1, wherein the acid content is 0.01 to 10 parts by mass relative to 100 parts by mass of the monomer components.

5. The polymerizable composition according to claim 1, wherein the free-radical polymerization inhibitor is at least one compound selected from the group consisting of a nitroso compound, a nitrone compound and a nitroxide compound.

6. The polymerizable composition according to claim 5, wherein the free-radical polymerization inhibitor is an N-nitrosophenylhydroxylamine salt derivative.

7. The polymerizable composition according to claim 6, wherein the content of the N-nitrosophenylhydroxylamine salt derivative is 0.001 to 1 parts by mass relative to 100 parts by mass of the monomer components.

8. A cured product obtained by polymerizing the polymerizable composition according to claim 1.

9. An adhesive comprising the polymerizable composition according to claim 1.

* * * * *